United States Patent
Reese et al.

(10) Patent No.: US 11,084,276 B2
(45) Date of Patent: *Aug. 10, 2021

(54) METHOD TO MONITOR ADDITIVE MANUFACTURING PROCESS FOR DETECTION AND IN-SITU CORRECTION OF DEFECTS

(71) Applicant: Arevo, Inc., Milpitas, CA (US)

(72) Inventors: Riley Reese, Milpitas, CA (US);
Hemant Bheda, Milpitas, CA (US);
Wiener Mondesir, Milpitas, CA (US)

(73) Assignee: Arevo, Inc., Milpitas, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/523,821

(22) Filed: Jul. 26, 2019

(65) Prior Publication Data

US 2020/0016883 A1      Jan. 16, 2020

Related U.S. Application Data

(63) Continuation of application No. 14/621,205, filed on Feb. 12, 2015, now Pat. No. 10,421,267.

(51) Int. Cl.
*B33Y 50/02* (2015.01)
*G05B 19/4099* (2006.01)
*G05B 19/418* (2006.01)

(52) U.S. Cl.
CPC .......... *B33Y 50/02* (2014.12); *G05B 19/4099* (2013.01); *G05B 19/41875* (2013.01);
(Continued)

(58) Field of Classification Search
CPC .............. B33Y 50/02; G05B 19/41875; G05B 19/4099; G05B 2219/49023;
(Continued)

(56) References Cited

U.S. PATENT DOCUMENTS

| | | |
|---|---|---|
| 5,093,610 A | 3/1992 | Bailey |
| 5,675,229 A | 10/1997 | Thorne |

(Continued)

FOREIGN PATENT DOCUMENTS

| | | |
|---|---|---|
| EP | 3045992 A1 | 7/2016 |
| EP | 3051445 A1 | 8/2016 |

(Continued)

OTHER PUBLICATIONS

Chakraborty, et al. Extruder path generation for Curved Layer Fused Deposition Modeling. Computer-Aided Design vol. 40, Issue 2, Feb. 2008, pp. 235-243; accepted Oct. 28, 2007.

(Continued)

*Primary Examiner* — Ming Y Hon
(74) *Attorney, Agent, or Firm* — Jing Wang; Ali Reza Alemozafar; Kenneth Ottesen

(57) ABSTRACT

The present invention provides a system and a method for real time monitoring and identifying defects occurring in a three dimensional object build via an additive manufacturing process. Further, the present invention provides in-situ correction of such defects by a plurality of functional tool heads possessing freedom of motion in arbitrary planes and approach, where the functional tool heads are automatically and independently controlled based on a feedback analysis from the printing process, implementing analyzing techniques. Furthermore, the present invention provides a mechanism for analyzing defected data collected from detection devices and correcting tool path instructions and object model in-situ during construction of a 3D object. A build report is also generated that displays, in 3D space, the structural geometry and inherent properties of a final build object along with the features of corrected and uncorrected defects. Advantageously, the build report helps in improving 3D printing process for subsequent objects.

20 Claims, 7 Drawing Sheets

(52) U.S. Cl.
CPC ............ *G05B 2219/32368* (2013.01); *G05B 2219/49023* (2013.01); *Y02P 80/40* (2015.11); *Y02P 90/02* (2015.11)

(58) Field of Classification Search
CPC ........... G05B 2219/32368; Y02P 90/02; Y02P 80/40; B29C 64/393
See application file for complete search history.

(56) References Cited

U.S. PATENT DOCUMENTS

| | | | |
|---|---|---|---|
| 6,441,342 B1* | 8/2002 | Hsu .................. | B23K 9/091 219/130.01 |
| 6,814,907 B1 | 11/2004 | Comb | |
| 6,823,230 B1 | 11/2004 | Jamalabad et al. | |
| 7,024,272 B2 | 4/2006 | Thomas et al. | |
| 7,483,818 B2 | 1/2009 | Amakai et al. | |
| 8,308,876 B2 | 11/2012 | Woods et al. | |
| 9,533,451 B2 | 1/2017 | Folgar et al. | |
| 9,592,660 B2 | 3/2017 | Reese et al. | |
| 9,595,037 B2 | 3/2017 | Glasgow et al. | |
| 9,656,429 B1 | 5/2017 | Mantha et al. | |
| 9,724,877 B2 | 8/2017 | Flitsch et al. | |
| 9,895,845 B2 | 2/2018 | Bheda et al. | |
| 9,908,978 B2 | 3/2018 | Reese et al. | |
| 10,052,813 B2 | 8/2018 | Armijo et al. | |
| 10,274,934 B2 | 4/2019 | Chang et al. | |
| 10,363,704 B2 | 7/2019 | Woytowitz | |
| 10,421,267 B2 | 9/2019 | Reese et al. | |
| 2002/0171703 A1 | 11/2002 | Phillips et al. | |
| 2003/0236588 A1 | 12/2003 | Jang et al. | |
| 2007/0242067 A1 | 10/2007 | Sharma et al. | |
| 2009/0284528 A1 | 11/2009 | Jensen et al. | |
| 2010/0312364 A1 | 12/2010 | Eryilmaz et al. | |
| 2011/0061591 A1* | 3/2011 | Stecker .............. | B22F 3/1055 118/663 |
| 2013/0101728 A1 | 4/2013 | Keremes et al. | |
| 2013/0196060 A1 | 8/2013 | Pla et al. | |
| 2013/0316081 A1* | 11/2013 | Kovalcik ............ | B29C 64/245 427/265 |
| 2014/0232035 A1 | 8/2014 | Bheda | |
| 2014/0277669 A1 | 9/2014 | Nardi et al. | |
| 2014/0291893 A1 | 10/2014 | Hopkins et al. | |
| 2014/0328963 A1 | 11/2014 | Mark et al. | |
| 2014/0336808 A1 | 11/2014 | Taylor et al. | |
| 2014/0371895 A1* | 12/2014 | Sadusk ............... | B29C 64/40 700/98 |
| 2015/0045928 A1* | 2/2015 | Perez ................. | B29C 64/112 700/110 |
| 2015/0052025 A1 | 2/2015 | Apsley et al. | |
| 2015/0165681 A1 | 6/2015 | Fish et al. | |
| 2015/0235069 A1 | 8/2015 | Kumar et al. | |
| 2015/0242564 A1 | 8/2015 | Chang et al. | |
| 2015/0246488 A1 | 9/2015 | Boettcher et al. | |
| 2015/0251356 A1* | 9/2015 | Batchelder ......... | B33Y 50/02 700/98 |
| 2015/0273583 A1* | 10/2015 | Bumgardner ....... | B22F 3/1055 419/53 |
| 2015/0321418 A1* | 11/2015 | Sterman ............. | B29C 64/118 264/40.7 |
| 2015/0321422 A1* | 11/2015 | Boyer ................. | B29C 64/393 264/497 |
| 2015/0328839 A1* | 11/2015 | Willis ................ | G05B 19/4099 700/98 |
| 2015/0331402 A1* | 11/2015 | Lin .................... | B33Y 50/02 700/119 |
| 2015/0336292 A1 | 11/2015 | Mikulak et al. | |
| 2015/0360288 A1 | 12/2015 | Zalewski et al. | |
| 2016/0075089 A1 | 3/2016 | Duro Royo et al. | |
| 2016/0086376 A1 | 3/2016 | Tang et al. | |
| 2016/0144565 A1 | 5/2016 | Mark et al. | |
| 2016/0151833 A1 | 6/2016 | Tsao | |
| 2016/0159012 A1 | 6/2016 | Lee et al. | |
| 2016/0176118 A1 | 6/2016 | Reese et al. | |
| 2016/0185044 A1 | 6/2016 | Leonard et al. | |
| 2016/0193785 A1 | 7/2016 | Bell et al. | |
| 2016/0236279 A1 | 8/2016 | Ashton et al. | |
| 2016/0236414 A1 | 8/2016 | Reese et al. | |
| 2016/0236416 A1* | 8/2016 | Bheda ................ | B33Y 50/02 |
| 2016/0236419 A1 | 8/2016 | Griffin et al. | |
| 2016/0266572 A1 | 9/2016 | Chang et al. | |
| 2016/0266573 A1 | 9/2016 | Bheda et al. | |
| 2016/0271880 A1 | 9/2016 | Bheda et al. | |
| 2016/0297142 A1 | 10/2016 | Bheda et al. | |
| 2016/0297935 A1 | 10/2016 | Reese et al. | |
| 2016/0332366 A1* | 11/2016 | Donovan ............ | B33Y 30/00 |
| 2016/0375635 A1 | 12/2016 | Tomuta | |
| 2017/0031639 A1 | 2/2017 | Cudak et al. | |
| 2017/0096576 A1 | 4/2017 | Bheda et al. | |
| 2017/0198104 A1 | 7/2017 | Bheda et al. | |
| 2017/0341183 A1 | 11/2017 | Buller et al. | |
| 2017/0351245 A1 | 12/2017 | Zhang et al. | |
| 2018/0043635 A1 | 2/2018 | Mantha et al. | |
| 2018/0147783 A1 | 5/2018 | Bheda et al. | |
| 2018/0300491 A1 | 10/2018 | Leach et al. | |
| 2018/0370145 A1 | 12/2018 | Woytowitz | |

FOREIGN PATENT DOCUMENTS

| | | |
|---|---|---|
| EP | 3234709 A1 | 10/2017 |
| JP | 5065299 B2 | 10/2012 |
| KR | 20130060144 A | 6/2013 |
| WO | WO-2015038072 A1 | 3/2015 |
| WO | WO-2015042422 A1 | 3/2015 |
| WO | 2015/120429 A1 | 8/2015 |
| WO | WO-2016196382 A1 | 12/2016 |
| WO | WO-2017077508 A1 | 5/2017 |
| WO | WO-2017210490 A1 | 12/2017 |
| WO | WO-2018/031594 A1 | 2/2018 |
| WO | WO-2018213334 A1 | 11/2018 |

OTHER PUBLICATIONS

Clausen, et al. Expoiting Additive Manufacturing Infill in Topology Optimization for Improved Buckling Load. Engineering 2.2 (2016): 250-257.
Co-pending U.S. Appl. No. 16/431,425, filed Jun. 4, 2019.
Co-pending U.S. Appl. No. 16/495,383, filed Sep. 18, 2019.
International search report and written opinion dated Nov. 22, 2017 for PCT Application No. PCT/US2017/045986.
Jin, et al. Modeling and process planning for curved layer fused deposition. Int J Adv Manuf Technol (2017) 91: 273. https://doi.org/10.1007/s00170-016-9743-5.; Accepted Nov. 7, 2016;First Online Nov. 18, 2016.
Jin, et al. Optimization of tool-path generation for material extrusion-based additive manufacturing technology. Additive Manufacturing vols. 1-4, Oct. 2014, pp. 32-47.DOI10.1016/j.addma.2014.08.004; Available online Sep. 16, 2014.
Notice of allowance dated Jan. 4, 2017 for U.S. Appl. No. 15/232,767.
Notice of allowance dated Apr. 27, 2017 for U.S. Appl. No. 15/232,767.
Notice of allowance dated Nov. 30, 2017 for U.S. Appl. No. 14/623,471.
Office action dated Mar. 30, 2017 for U.S. Appl. No. 14/623,471.
Office action dated Aug. 30, 2017 for U.S. Appl. No. 14/623,471.
Office action dated Sep. 14, 2017 for U.S. Appl. No. 14/621,205.
Office action dated Nov. 14, 2016 for U.S. Appl. No. 15/232,767.
PCT/US2018/032805 International Search Report and Written Opinion dated Sep. 21, 2018.
Stamati, et al. Building Editable B-rep Models from Unorganized Point Clouds. Noname manuscript No. TR-CS-2010-04, Jul. 7, 2010 (Year: 2010).
U.S. Appl. No. 14/621,205 Notice of Allowance dated May 1, 2019.
U.S. Appl. No. 14/621,205 Office Action dated Apr. 13, 2018.
U.S. Appl. No. 14/621,205 Office Action dated Jan. 14, 2019.
U.S. Appl. No. 14/621,205 Second Notice of Allowance dated Aug. 12, 2019.
U.S. Appl. No. 15/479,055 Office Action dated Sep. 18, 2019.
U.S. Appl. No. 15/864,425 Office Action dated May 24, 2019.

(56) References Cited

OTHER PUBLICATIONS

U.S. Appl. No. 16/052,945 Notice of Allowance dated Mar. 6, 2019.
U.S. Appl. No. 15/864,425 Notice of Allowance dated Oct. 2, 2019.
Wong, et al. A review of additive manufacturing. ISRN Mechanical Engineering 2012.
Wu, et al. Infill Optimization for Additive Manufacturing—Approaching Bone-like Porous Structures. IEEE Transactions on Visualization and Computer Graphics (2017).
U.S. Appl. No. 15/479,055, Notice of allowance and fee(s) due, dated Oct. 8, 2020.
U.S. Appl. No. 16/431,425, Office action dated Sep. 11, 2020.
G.Q. Jin, W.D. Li, L. Gao, An adaptive process planning approach of rapid prototyping and manufacturing, Robotics and Computer-Integrated Manufacturing, vol. 29, Issue 1, 2013, pp. 23-38 (www.sciencedirect.com/science/article/pii/S0736584512000853) (Year: 2013).
U.S. Appl. No. 15/479,055, Office action dated Jun. 19, 2020.
EP application No. 17840170.9, "Extended European search report," dated Mar. 3, 2020.
U.S. Appl. No. 15/479,055, Office action dated Mar. 5, 2020.
Co-pending U.S. Appl. No. 16/722,207, filed Dec. 20, 2019.
Co-pending U.S. Appl. No. 16/688,316, filed Nov. 19, 2019.
U.S. Appl. No. 16/431,425, Office action dated Apr. 21, 2021.
U.S. Appl. No. 16/722,207, Office action dated Apr. 30, 2021.
U.S. Appl. No. 16/722,207, Notice of Allowance and Fee(s) Due, dated Jul. 1, 2021.

\* cited by examiner

METHOD TO MONITOR ADDITIVE MANUFACTURING PROCESS FOR DETECTION AND IN-SITU CORRECTION OF DEFECTS

CROSS-REFERENCE

The present application claims priority to U.S. application Ser. No. 14/621,205, filed Feb. 12, 2015, now U.S. Pat. No. 10,421,267, issued Sep. 24, 2019, which is entirely incorporated herein by reference.

FIELD OF THE INVENTION

The present invention generally relates to the field of additive manufacturing process or 3D printing of objects, and more particularly to a method for real time monitoring, detecting and correcting defects during the additive manufacturing process.

BACKGROUND

The additive manufacturing process is widely known as the three dimensional printing of 3D objects. Numerous methodologies have been described in prior art, the most common including solid-laser-sintering ("SLS"), stereolithography ("SLA"), and extrusion based 3D printing or FFF (fused filament fabrication). Extrusion-based 3D printing involves the deposition of thermoplastic materials. Prototyping is the most common application of extrusion-based printing today, using materials such as ABS (acrylonitrile butadiene styrene) and PLA (polylactic acid). Further, the technologies have progressed to where the 3D printing also utilizes higher-end engineering semi-crystalline and amorphous polymers as well as metals and ceramics with greater mechanical, chemical, thermal and electrical properties. Examples of semi-crystalline polymers include polyetheretherketone (PEEK), polyetherketoneketone (PEKK), etc. Examples of amorphous engineering polymers include polyphenylsulphone (PPSU), polyetherimide (PEI), etc.

Prior art for extrusion based 3D printing teaches extruding the filament through an extruder and depositing the extrudate on a build platform, a layer at a time to form a 3D object in open loop with no feedback concerning the build process or quality of deposition. As a result, defects in the 3D object printing lead to one or more errors in its geometry (i.e. dimensions or contours) or deficiencies in desired properties (e.g. mechanical, chemical, thermal, or electrical properties).

These defects, errors, or characteristics that depart from the intended design, due to deviation in filament diameter, filament feed rate, nozzle orifice, result in inaccurate volume of extrudate deposition; inaccuracy in the print head to follow the desired tool path causing out of tolerance features; deviation in heating or cooling temperature of the deposited material resulting in defects such as drooping/sagging, reduced crystallinity, slow solidification, air bubbles, delamination, overhangs, warping, or poor adhesion between printed layers of the object or the build plate. Hence, these defects if not corrected, lead to flaws, such as insufficient mechanical, chemical, thermal, or electrical properties, in the printed object.

One of the 3D printing methods used is illustrated in FIG. 1. A slicing software slices a 3D object file (100) into a number of layers (102) using slicing parameters such as filament diameter, nozzle orifice, layer thickness, fill ratio, print head speed etc. Tool path instructions (104) are generated for each layer and are fed to a 3D printer where each layer is printed without any means to monitor, detect or correct errors or modify slicing parameters based on analysis of printed layers. If the printing of the layers to build the object is finished (106), the printing stops (108). Otherwise, the method loops back to printing next layer by the extruder (104).

The prior art do not disclose providing a quantitative and qualitative report that may inform a user of the 3D printing process about the structure of the printed object along with the features of the defects and further, guide the user to keep or scrap the object. Also, such reports guiding in improving the printing of three dimensional objects are lacking in the prior art.

Therefore, there exists a need in three dimensional printing methods for monitoring and identification of defects formed in a 3D object while it is being printed, and further, in-situ correction of the defects in the object simultaneously as the object is being printed. There also exists a need for a closed-loop slicing engine that updates the slicing parameters and object model in-situ, based on the defect data and object geometry. Furthermore, there exists a need in three dimensional printing for developing a report displaying geometry and the features of corrected and uncorrected defects in the 3D printing processes for improvement in the printing.

SUMMARY OF THE INVENTION

The present invention provides an improved method of additive manufacturing comprising monitoring and identification of defects occurring in a 3D object while it is being printed; in-situ correction of defects in the object based on a quality control feedback while printing process; and updating slicing parameters and object model based on the correction. A 3D object segment or layer is sliced based on slicing parameters and object property requirements. Tool path instructions for segment or layer are generated and fed to 3D printer for printing. Quality of printed segment, layer, or build feature (i.e. through-hole, overhang, contoured section, etc.) is analyzed for defects. If it is possible to correct the defects, tool path is generated for a particular tool, with a capability such as milling, drilling, heating, and extrusion etc., attached to a head capable of following multi-dimensional path.

Next, the object model and slicing parameters are updated based on analysis of previously printed segment, layer, or build feature, including defects and corrected defects. A qualitative and quantitative report for the segment, layer, or build feature is generated. This report also logs monitored parameters such as temperature, speed, amount of material used, and any imaging data. Once the object is completely printed, a final report including property analysis is generated. Final report verifies whether or not the object meets intended properties and based on the in-situ parameter adjustments during build, it records modified tool path instructions for next build.

An objective of the present invention is to provide a system of monitoring, identifying and correcting defects, while also updating tool path instructions and object model in-situ during the formation of 3D objects, effectively adding a closed loop feedback system for part quality.

An objective of the present invention is to provide a method of monitoring, identifying and correcting defects, and updating tool path instructions and object model in-situ during the formation of 3D objects printed, effectively adding a closed loop feedback system for part quality.

An objective of the present invention is to provide a plurality of functional tool heads having multi-axes motion mechanism that are independently and automatically controlled to perform one or more functions that are based on a feedback analysis for correcting the defects.

Another objective of the present invention is to provide a means for logging real time events such as identified defect information, critical feature measurements, dimensionality, contour of the printed 3D object, location of the defects and the correction mechanism taken.

Another objective of the present invention is to generate a build report listing the defects (both corrected and uncorrected) in the printed 3D object and using the build report for predicting properties of the final build part, such as mechanical strength, electrical and/or thermal conductivity, chemical resistivity, EMI/ESD sensitivity, etc. The build report can also be used to optimize the build parameters and tool path for this build object to minimize the presence of defects in future runs.

DETAILED DESCRIPTION OF THE EMBODIMENTS

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention provides a system and a method for additive manufacturing process to build or print a 3D object/part that include and is not limited to three dimensional printing methods, such as extrusion based, fused filament fabrication, droplet based, jetting methods and the like. More particularly, the invention provides a system and a method to monitor the printing process and identify, in real time, defects occurring in an object while it is being printed through the additive manufacturing process and further, in-situ correcting the defects, in real time, in order to produce a printed 3D object, which meets the intended specifications (e.g. geometrical, mechanical, chemical, or thermal, or electrical).

During additive manufacturing or three dimensional printing processes, incorrect or inaccurate building of the part can occur. This means, that during such printing processes, defects in the structural geometry of the part are incurred and may also diminish its inherent or intended properties. This may occur, for example, if the printing processes lack accuracy in deposition of building material by a print head while printing the object, or lack insufficient feedback analysis that can identify one or more defects occurring in the object while it is being printed. Hence, many objects/parts may get incorrectly built and the finished part will not meet its intended specifications. Because extrusion-based systems are high dynamic not only at the system level but also at the fluidic level, certain instances of defects are inevitably unavoidable.

Therefore, the present invention provides a system and a method for efficiently monitoring the printing process and identifying the defects in the object, in real time. Further, the invention provides a mechanism to correct the defects, in real time, simultaneously while the object is being printed. Furthermore, the invention provides a mechanism for analyzing the data collected from the detection devices and updating tool path instructions and object filament model in-situ during the construction of a 3D object.

Figure 1:
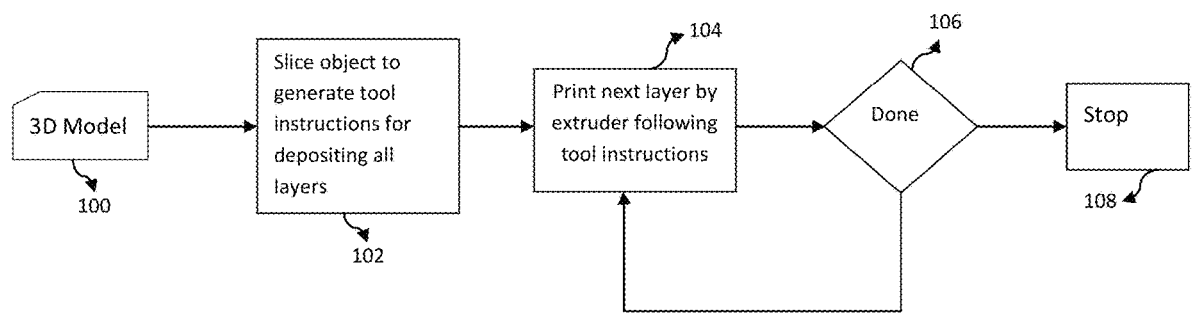
FIG. 1 illustrates a flow diagram showing one of the conventional ways of performing additive manufacturing to build 3D objects.
Figure 2:
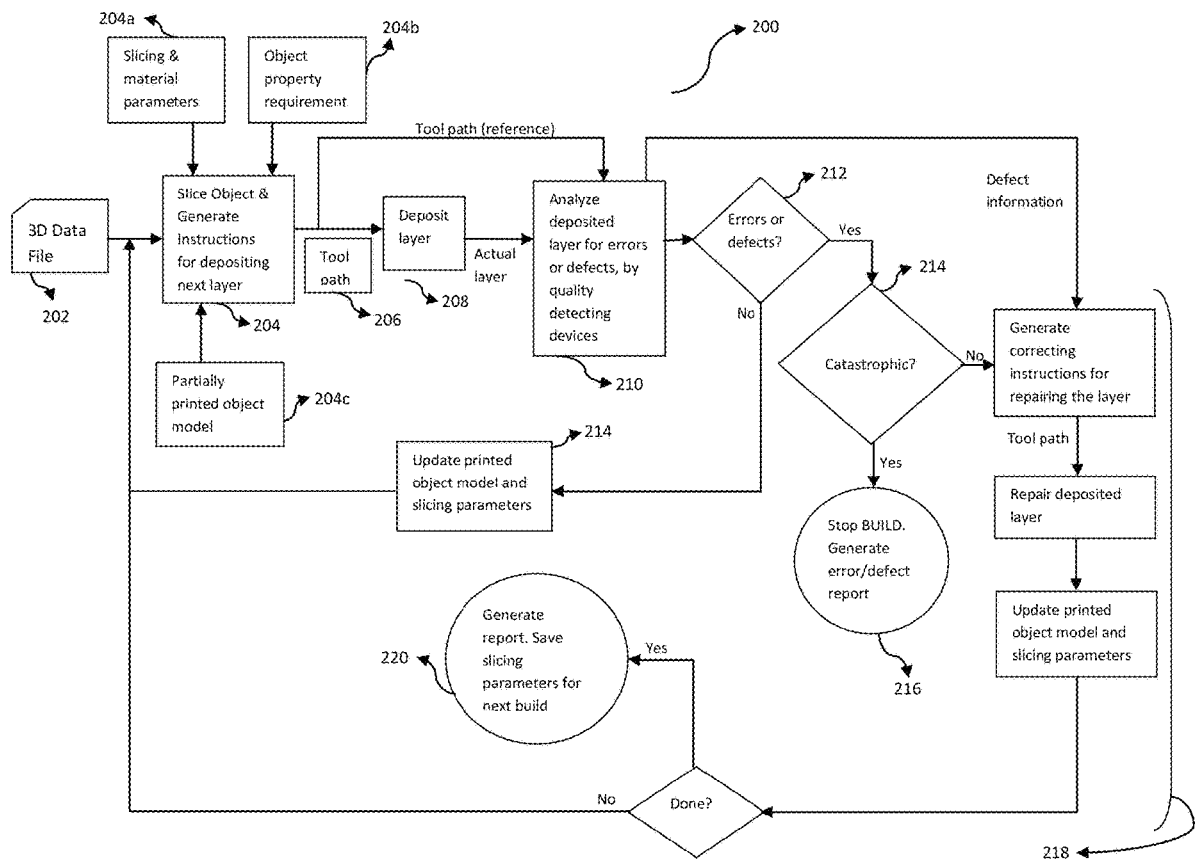
FIG. 2 illustrates a system showing a logic flow of a closed feedback system for printing 3D objects using additive manufacturing method, in accordance with an embodiment of the invention.

FIG. 2 illustrates a system showing a logic flow of a closed feedback system for printing 3D objects using additive manufacturing method, in accordance with an embodiment of the invention. A user may input desired characteristics of a 3D (three dimensional) object that needs to be printed along with its inherent properties, through a user device. The characteristics inputted by the user may be object properties that are required in a final object, including and not limited to physical geometry of the object, along with inherent properties like mechanical, electrical, chemical, and/or thermal properties and features that are required to build the object. The user device contains a 3D modeling program, which may be used with a 3D data file 202 that defines the property requirements 204b of the printing object. In an embodiment, the user device may contain programs such as AutoCad, wherein the user may prepare a CAD file defining the characteristics of the 3D object, including geometrical, mechanical, thermal, chemical, electrical and other property constraints of the object. In an embodiment, the 3D data file 202 may be a CAD file, or an STL file or a COD file, and the like. The user device uses conventionally available techniques to create a blue print for printing the 3D object. Thereafter, the 3D data file 202 is fed to a first engine, such as a slicing engine, of the system 200 for discretizing the 3D data file 202 into a plurality of segments along arbitrary planes. Additionally, the slicing engine is also capable of discretizing the 3D data file 202 into a number of slices along two dimensional planes. A set of tool path instructions 206, therefore, are then formulated using the slicing engine, by implementing property analyzing techniques and involving a set of slicing and material parameters 204*a* and object property requirements 204*b*. One embodiment of the present invention may employ finite element analysis as the property analysis method.

The determined tool path instructions 206 are further adopted by a tool of a printing or build apparatus to print the object. The tool path instructions 206 generated by the slicing engine are the set of instructions that are followed by a material extruding tool head for building a 3D object. Therefore, the extruding tool head may deposit a number of printable layers of building material (as shown by 208) following the tool path instructions 206 for printing 3D object. Also, the tool path instructions 206 may be modified in-situ during the construction of a 3D object, where the modification is based on a feedback analysis that is generated from a set of data collected by one or more detection devices.

The system 200 further comprises a build apparatus that is used for printing the 3D object. The build apparatus comprises a printing platform where the three dimensional printing of the object is carried out. The build apparatus may be in communication with the user device in order to receive controlling signals or tool path instructions 206 from the user device. The build apparatus may further comprise a plurality of functional tool heads with plurality of tool attachments that perform different functions associated with and required in the 3D printing process. The plurality of functional tool heads are attached to multi-axis motion mechanism for providing movement of the tool heads in arbitrary manner, for example in x, y and z-axis. The tool attachments attached to the plurality of functional tool heads perform a variety of functions that may include but are not limited to printing the object by depositing the building material layer by layer while also providing support in printing the object, such as milling bit, deburring tool, cooling means, heating means, and the like.

Furthermore, the tool attachments also have the ability to orient themselves with multiple degrees of freedom since they are attached to functional tool heads provided with multi-axis motion mechanism. For a person skilled in the art, it may be obvious that multi-axis motion mechanism, such as robotic arms or manipulators, are present in the art to provide attachment for a number of tool attachments and allow them to perform various functions. In an embodiment, the functional tool heads along with tool attachments may have more than one, such as 5 or 6, degrees of freedom of motion.

In a further embodiment of the present invention, one of the tool attachments may act as an extruder or print head or an extruding channel for depositing material for the additive construction, while the other tool attachments may perform other ancillary functionalities such as cooling, heating, deburring, milling etc. The tool attachments of the build apparatus may function based on the tool path instructions 206, and are controlled by a controller. Further, each of the tool attachments may be independently controlled by the controller based on the type of tool path instructions 206 accorded to each tool attachment depending on the type of function it performs.

In an embodiment of the present invention, the tool attachments perform printing and corrective functions, and may comprise a material deposition head, laser for heating, milling bit, deburring tool, cooling means, heating means and other tools with different functionalities used in 3D printing process.

In an exemplary embodiment, only one of the tool attachments attached to the functional tool heads may perform as print head that extrudes building material to print the object; while the other tool attachments may perform as correction devices. The functional tool head whose tool attachment is working as a print head for the printing apparatus may be referred to as 'first functional tool head' or an 'extruding head', extruding printable layers of building material on the printing platform to print a 3D object. Hereinafter, the first functional tool head and extruding head may be used interexchangeably. Further, the extruding head may be controlled by a controller to extrude material depending on the tool path instructions 206 generated by the slicing engine. Therefore, to accomplish this, the user device sends the evaluated tool path instructions 206 to the controller that further controls the actions of the extruding head to extrude printing layers of the build material (as mentioned in 208).

As mentioned above, one or more functional tool heads may act as corrective devices. These corrective devices may be controlled by the controller or a defect feedback controller managing the functions of the corrective devices to be performed. In an embodiment, the system for printing a 3D object may comprise the same controller for controlling and generating instructions for the extruding head and the corrective devices both. In another embodiment, the extruding head and the corrective devices are controlled by a first controller and a second controller respectively.

Corrective devices are utilized in the build apparatus to correct the defects formed in a 3D object while it is being printed by the extruding head. As may be a case, while printing an object, there may be occurrence of air bubbles, or excess polymer in the object that may act as a structural defect, a defect reducing the dimensional tolerance of the object, and also a defect in mechanical strength of the object. To a person skilled in the art, there may be a number of different defects occurring in printing of the object, such as in structure of object, or in build volume where printing happens, and the like. Thus, to correct such defects during printing of the object, the present invention provides corrective devices in the build apparatus.

The corrective devices are the functional tool head attachments that work on the instructions generated by the defect feedback controller. The instructions are generated in response to the defects detected by one or more monitoring devices, such as quality detecting devices. In an embodiment, the defects that may form during the printing process in the object may be drooping/sagging, insufficient crystallinity, slow solidification, out of tolerance feature, air bubbles, excess polymer, delamination, overhangs, warping, adhesion between printed layers of the object and the like.

The corrective devices for correcting defects are functional based. In an embodiment, the corrective devices may perform different type of functions including and are not limited to cooling, heating, milling, deburring, air blowing and the like that are needed to assist the printing of the object in order to get final printed object with minimal defects.

The monitoring devices or the quality detecting devices continuously monitor (210) and identify the printing defects in the object while it is being printed, in real time. To perform this function, the quality detecting device may employ detecting techniques that efficiently identify the features of the defects forming in the object, in real time. In an embodiment, the detecting techniques include and are not limited to visual imaging, IR/thermal imaging, laser techniques, audio microphones, and the like to identify the features of the defects such as location, type, corrective action, temperature and the like. The quality detecting devices may include but are not limited to camera, lasers, or any other available image detection devices, infrared devices to check the geometry of the object, audio microphones to capture abnormal extrusion sounds, which indicates if the filament is properly dried, and the like devices. As the extruding head deposits the actual printable layer for building the object, the quality detecting devices continuously monitor and analyze the deposited layer for errors or defects, as shown by 210 in FIG. 2.

When the defects are identified by the quality detecting devices, the features of the defects are communicated to the controller, such as a defect feedback controller, where the defects are analyzed and processed. Thereafter, a corresponding set of correcting instructions for the corrective devices are generated by the defect feedback controller. The functional tool heads attached to the corrective devices may control them depending on the correcting instructions, and instruct the corrective devices to perform accordingly. This further means, depending on the defect identified, the defect feedback controller may generate correcting instructions and instruct the corrective devices to perform the corresponding function for the specific defect. If an identified defect is catastrophic (i.e. cannot be corrected to meet the user's specification), the build may terminate and the defect may be recorded and highlighted in a build report.

In an embodiment of the invention, the quality detecting devices while monitoring the printing process may come across situations when there are no errors in the printing process (shown by 212). In such situations, the system 200 may update the printed object model along with the slicing parameters and tool path instructions 206 followed by the tool heads, as shown by 214 in the system 200. On the contrary, the quality detecting devices may detect one or more defects in the printing process. Depending on the feature of defects, the system 200 stops building the object and generates a build report featuring the defects/errors. This may be the case when the errors are catastrophic (shown by 216).

On the other hand, when the errors are not catastrophic, the defect feedback controller may generate a set of correcting instructions for repairing the defects in the printable layer. The system 200 allows for in-situ correction of such defects. Therefore, the functional tool heads with the corrective devices repair the defects according to their functions while the object is being printed. Thereafter, repairing the defects, the system 200 may update the printed object model along with the slicing parameters and tool path instructions 206 followed by the tool heads. This is depicted by the part 218 of the system 200. Further, if the printing of the object is completed, the system 200 may generate a build report comprising features of the defects and their corrective instructions employed. Furthermore, the optimized slicing parameters are saved for the next build.

In an embodiment, the identified defects along with the detected build parameters (for example extrudate width, layer height, etc.) are analyzed in-situ during the printing process by a slicing feedback controller. The analysis is done in comparison to the intended object geometry and properties (for example mechanical, thermal, chemical, electrical, etc.). Based on this analysis, the slicing feedback controller generates a set of slicing instructions. The slicing instructions adjust the tool path instructions 206 for all subsequent layers to reduce the future occurrence of defects and ensure that the intended object requirements are met.

In an embodiment of the present invention, a single controller may perform the functions of the controllers that are the defect feedback controller and the slicing feedback controller for controlling the extruding head and the corrective devices.

In this way, the system may monitor the printing process, in real time, implementing the quality detecting devices to identify defects and generate appropriate correcting instructions for correcting the defects, and adjust the tool path instructions for following layers. This correction process occurs in-situ with the printing of the 3D object. Resultantly, the present invention provides a system for real time monitoring and identifying the defects occurring in a 3D object using quality detecting device, while it is being printed, and accordingly taking appropriate correction measures, using corrective devices to build a final build object with minimal defects.

The build device provides independent and automated control of the functional tool heads with the extruding head and the corrective devices based on the feedback analysis from the quality detecting devices and the defect feedback controller.

In an embodiment of the present invention, the build apparatus may contain a single functional tool head having a plurality of attachment points for attachment of a plurality of tools for performing different functions. In case of the build apparatus having a single functional tool head with attachment points for a plurality of tools, the controller sends instructions to the single functional head and instructs it to choose the desired tool.

Each of the functional tool heads are the working tools of the build apparatus that are working independently of each other and are automatically driven based on the instructions received from the user device and the defect feedback controller.

While the corrective devices repair the defects during the printing process, the slicing feedback controller also analyzes the collected information about the defects and build parameters to determine the in-situ object geometry and object properties (i.e. mechanical, chemical, thermal, electrical, etc.). The in-situ object geometry and properties are analyzed in comparison to the input object requirements to generate the appropriate instructions for the slicing engine. These instructions modify the slicing parameters and the resulting tool path instructions 206 to reduce the future occurrence of defects and ensure that the object requirements are met.

The present invention provides a system for generating optimal tool path instructions 206 for building a 3D object. Further, the present invention provides a build apparatus for real time monitoring, identifying and correcting the defects forming in the 3D object, while it is being printed, by implementing plurality of quality detecting devices and corrective devices with multiple degrees of freedom. Furthermore, the present invention provides a system to modify the tool path instructions 206 in-situ during the construction of a 3D object based on the feedback analysis from the data collected by the quality detection devices.

For the additive manufacturing process, the extruding head may be fed with a building material from which the object may be printed. In an embodiment, the building material may be an amorphous polymer, a semi-crystalline polymer, a metal, a ceramic, carbon or other reinforced material, or the like.

In an embodiment of the present invention, the movement of the functional tool head is controlled by the controller. The controller on receiving the tool path instructions, required for printing the 3D objects, control the movement of the functional heads. The movement of the functional heads can be done either through Cartesian mechanism or through non-Cartesian mechanism. In case of Cartesian movement, the functional heads are moved in X, Y and Z-axis and the movements are restricted to axial movement. In case of Non-Cartesian movement, the functional heads are free to move in any axis.

The components of the system 200 will be described in details in following figures.

Figure 3:
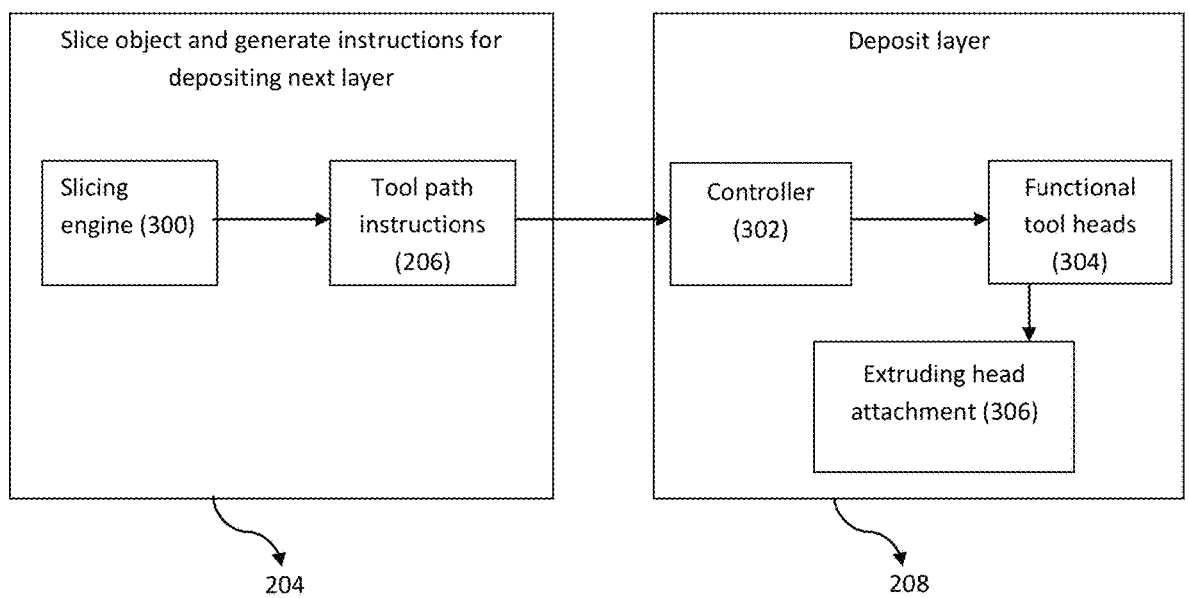
FIG. 3 illustrates a flow diagram depicting a relation between a slicing engine and functional tools of a 3D printing machine, including an extruder, in accordance with an embodiment of the present invention.

FIG. 3 illustrates a flow diagram depicting a relation between a first engine, such as a slicing engine and functional tools of a 3D printing machine, including an extruder, in accordance with an embodiment of the present invention. FIG. 3 shows a block diagram illustrating components of the system 200 that help in slicing a 3D data file into printable layers and depositing the layers. To print a 3D object, a user utilizes a user device to input the desired characteristics of the object represented in a 3D data file. The present invention determines slicing parameters and optimal tool path instructions 206 for the object. For determining the optimal tool path instructions 206, the system 200 may utilize detecting and analyzing tools.

The tool path instructions 206 may be determined based on the slicing parameters and material properties 204a; and the object property requirements 204b. The tool path instructions 206 are the instructions that may be followed by an extruding tool head in order to print the layers of a building material to form a 3D object on a build platform. Additionally, the tool path instructions 206 are modified in-situ during the construction of a 3D object based on the analysis from the slicing feedback controller.

The present invention may comprise a slicing engine 300 that considers the slicing parameters and material properties 204a and object property requirements 204b for discretizing a 3D data file 202 of a desired object to be printed. The slicing engine 300 discretizes the 3D data file 202 into a plurality of segments aligned along arbitrary plane. In an embodiment, the slicing engine 300 may also slice the 3D data file 202 into plurality of two dimensional layers for printing. Thereafter, tool path instructions 206 are generated based on the discretization done by the slicing engine 300.

The generated tool path instructions 206 are followed by an extruding head attachment 306 of the functional tool heads 304, controlled by a controller 302. Therefore, as the tool path instructions 206 are generated, the controller 302 controls the functional tool heads 304 and instructs them to perform the desired extrusion of building material. Since, the extrusion happens utilizing the extruding head 306, therefore, the functional tool heads activate its extruding head or mounts the extruding head attachment, and instructs it to deposit the printable layers of building material following the tool path instructions 206. In this way, the extruding head 306 deposits a plurality of printable layers under the control of the controller 302, and follows the tool path instructions 206.

The functional tool heads 304 are the automatic working devices of the build apparatus having multiple degrees of freedom of motions that print a 3D object and also supports in printing such objects. In an embodiment, the functional tool heads 304 may have more than one, such as 5 or 6, degrees of freedom of motion.

The extruding head of the build apparatus may be fed with a building material of which the 3D object may be build. In an embodiment, the building material may be an amorphous polymer, a semi-crystalline polymer, metal, ceramic, carbon or other reinforced material.

Figure 4:
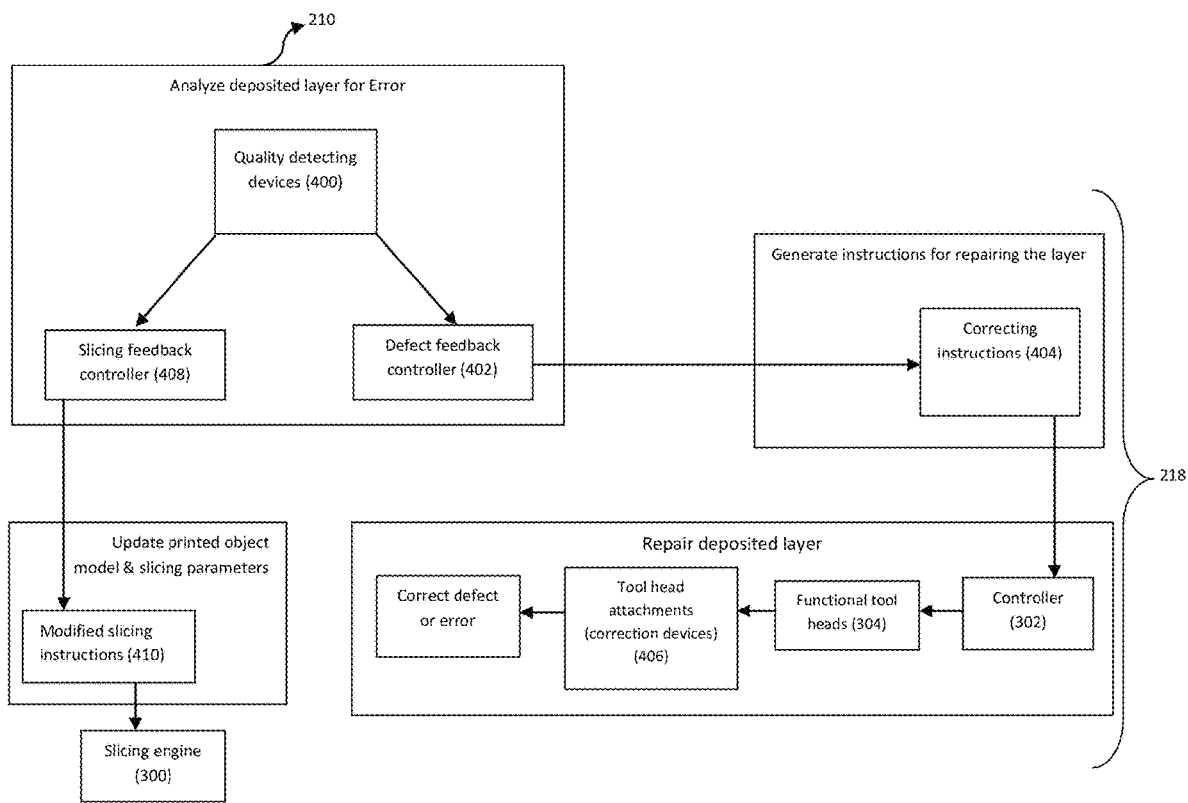
FIG. 4 illustrates a part of the system 200 for analyzing 3D printed objects, repairing defects generated during printing, and updating tool path instructions and object model, in accordance with an embodiment of the present invention.

FIG. 4 illustrates a part of the system 200 for analyzing 3D printed objects, repairing defects generated during printing, and updating slicing parameters and printed object model 214, in accordance with an embodiment of the present invention. As described in FIG. 2, besides the extruding head, the other functional tool heads can act as corrective devices for the printing process. The corrective devices are those automatic working devices of the printing process that may assist the printing of an object by correcting defects forming in the object, in real time. During the printing of the object using the extruding head, one or more defects may be formed in the object. In an embodiment, the type of defects may include but are not limited to drooping/sagging, insufficient crystallinity, slow solidification, out of tolerance feature, air bubbles, excess polymer, delamination, overhangs, warping, adhesion between printed layers of the object and the like that can result in insufficient mechanical, chemical, thermal, or electrical properties of the object.

Further, the system 200 may comprise one or more monitoring devices, such as quality detecting devices 400. The quality detecting device 400 may continuously monitor the printing process and identify one or more defects forming within the object, in real time. In an embodiment, real time monitoring by the quality detecting devices 400 includes device that involves the use of infrared, x-ray, or visual imaging to detect dimensionality and contour of the build; or use of audio microphones to detect if the filament is dry; or defect sensing including identification of the type of defects, such as vacancies, excess material deposition, trapped air bubbles, and the like, along with other features of the defects, such as location of defects, and number of defects, and the like. The quality detecting devices 400 also involve measurement of critical features of the object to ensure each feature is within an acceptable tolerance specified by the user.

The quality detecting devices 400 may make use of detecting techniques for real time monitoring the building process and identifying the defects in the object. In an embodiment, the detecting techniques includes and are not limited to visual imaging, IR/thermal imaging, laser techniques, audio microphones, and the like to identify the features of the defects such as location, type, correction action, temperature and the like.

While the 3D object is being printed by the extruding head, the quality detecting devices 400 in the build apparatus keep a continuous check on the printing process and monitor the process in real time. Therefore, the quality detecting devices 400 may identify the defects forming in the object, by implementing various detecting techniques. After identifying the defects, the quality detecting devices 400 may store the captured data in a data storage module, where the data defines the features of the defect, such as location, type, etc., critical feature measurements, dimensionality, and contour of the build object. Thus, the present invention provides recording and logging of real time events, such as defects, corrections, location of each defect in 3D space, and recording of modifications to the object model and slicing parameters.

Thereafter, the detected data may be transferred to a controller, such as a defect feedback controller 402 that implements analyzing tools to predict a set of correcting instructions 404. The correcting instructions are the steps that should be taken to correct the defects and predict the properties of the object considering the types of defect identified by the quality detecting devices 400. In an embodiment, the defect feedback controller 402 may be a correction module that analyzes the collected data from the quality detecting devices 400 and generates a feedback (including correcting instructions 404) depending on the features of the defects. In another embodiment, a slicing feedback controller 408 analyzes the collected information about the defects and build parameters to determine the in-situ object geometry and object properties (i.e. mechanical, chemical, thermal, electrical, etc.). The in-situ object geometry and properties are analyzed in comparison to the input object requirements to generate the appropriate slicing instructions 410, depending on the defected data, for the slicing engine 300. These slicing instructions 410 in-turn modify the tool path instructions 206 to reduce the future occurrence of defects and ensure that the object requirements are met.

In an embodiment, the system 200 for printing a 3D object comprises a single controller that controls and generates instructions for both the extruding head and the corrective devices.

The defect feedback controller 402 may determine the properties of the object being printed and the correcting instructions 404, based on the defects identified and the desired strength needed in the object. Further, the defect feedback controller 402 may instruct the corrective devices to perform their corresponding functions based on the correcting instructions 404. The determined correcting instructions 404 may be fed to the controller 302 that further controls the functional tool heads 304. After receiving the correcting instructions 404, the functional tool heads 304 instruct their required tool head attachments, which are corrective devices 406 here, since correcting instructions are needed. Resultantly, the corrective devices 406 perform the required functions based on the correcting instructions 404 in order to correct the defects/errors occurring in the printing.

In an embodiment, the corrective devices 406 are attached to the functional tool heads 304 to perform a type of function for correcting a corresponding defect, where the type of function may include cooling, heating, milling, deburring, air blower, and the like that are needed to assist the printing of the object in order to get final printed object with minimal defects. Therefore, the correction devices 406 may perform a function required to correct a corresponding defect.

For an instance, if the quality detecting devices 400 identify that the printed layers of the build material are not adhering properly with each other, and it is resulting in inaccurate geometry, reduced mechanical strength, reduced thermal or electrical conductivity, or the like of the object, the defect feedback controller 402 determines that the printing process needs heating of the deposited build material for proper adhesion of the layers. Thus, the defect feedback controller 402 may determine 'heating' as the correcting instruction 404 and instruct a corresponding corrective device (406) to perform heating of the deposited layers to ensure proper adhesion. Based on the identified defect, the slicing feedback controller 408 may modify the slicing instructions 410 in order to further modify the tool path instructions 206 for reducing the future occurrence of defects and ensure that the object requirements are met. For this instance, the modified slicing instructions may involve decreasing the layer height, increasing the material feed rate, and/or increasing the extrudate width.

Therefore, the system 200 provides real time monitoring of the printing process and identifies the defects forming in the object, by implementing quality detecting devices 400. Further, the controller 302 provides independent and automatic control of the corrective devices, based on the feedback analysis, in order to correct the defects in the object and modify appropriate tool path instructions 206, in real time and resultantly have a 3D object with minimal defects.

In an embodiment of the present invention, the build apparatus may contain a single functional tool head 304 having a plurality of attachment points for attachment of a plurality of tools performing different functions. In case of the build apparatus having a single functional tool head with attachment points for a plurality of tools, the controller may send instructions to the single functional head and instructs it to choose the desired tool.

In another embodiment of the present invention, the functional tool heads may be attached to a plurality of tool attachments wherein the movement of the plurality of tool attachments is controlled by the controller. Each of the plurality of tool attachments contains an attachment point which provides an attachment mean to the functional tool head 304 required for different functionalities in 3D printing process. Each of the tool attachments or arms are the working tools of the build apparatus that are working independently of each other and are automatically driven based on the instructions received from the controller 302 and the defect feedback controller 402.

Further, while simultaneously printing the object using the first functional heads and correcting the defects in the object, the printing system also provides a build report. After the completion of the process of printing the object and correcting the defects, a build report may be generated at the user device. Based on the feedback from the printing and correcting processes, a build engine of the user device may generate a build report visually displaying, in 3D space, each corrected and uncorrected defect detailing its type and location within the object. The defect information in the build report is utilized by an analyzing module of the user device to predict the material properties of the final object based on the type, number, and location of corrected and uncorrected defects. The analyzing module may implement analyzing techniques, such as finite element analysis.

The build report also compares the actual material properties of the final object compared to the user's inputted specifications and identifies any properties that fall outside the specifications, by implementing analyzing techniques. The information in the build report may help a user to decide whether to keep the final object or scrap the object based on the resultant properties acquired in the final printed object and the features of the corrected and uncorrected defects. This step is a critical step in identifying the worth or suitability of the final object for its intended use.

Further, in an embodiment, the build report may also help in resolving the mechanical or thermal behavior and uncorrected defects of the built object when it may be re-printed using the similar building constraints and parameters. Thus, the generation of the build report may aid in the optimization of the tool path instructions 206 when printing the same or similar objects with desired properties and also help in deciding the worth of the final printed object. Therefore, an analyzing technique, such as finite element analysis, may be run on the build report to predict the material properties of the final object and decide whether to keep or scrap the final object based on the resultant properties.

Figure 5:
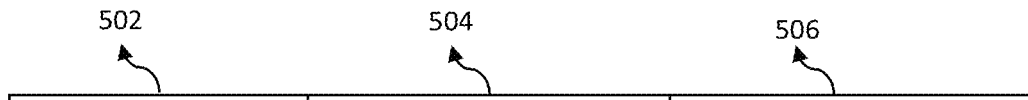
FIG. 5 illustrates a table showing the types of defects, the technique by which it is detected and suggested course of action for correcting the defect, in accordance with an embodiment of the present invention.

FIG. 5 illustrates a table showing the types of defects, the technique by which it is detected and suggested course of action for correcting the defect, in accordance with an embodiment of the present invention. The column 502 shows the defects that may occur while a 3D object is being printed. During printing, a defect might occur, for example deposition of excess polymer by the first robotic manipulator. This type of defect may be detected by Visual Imaging, Laser (504). Thereafter, the defect feedback controller 402 may determine the course of action (correcting instructions) that may include deburring, radiative heating, or tamping (506). This course of action is then signaled to the appropriate functional tool head 304 that performs either deburring, or radiative heating, or tamping. The defect feedback controller 402 provides instruction to the required functional tool head 304 and the functional tool head 304 performs the function through its movement in x, y and z axis. The movement of functional tool head 304 is required for correcting the defects in 3D manner. In an embodiment of the present invention, the movement of functional tool head 304 can be performed either in Cartesian mechanism where the tools heads are moved by the directional coordinates in X, Y and Z direction, or it can be through non-cartesian mechanism wherein the functional tool heads 304 can move in three dimensional space freely.

The slicing feedback controller 408 may also generate slicing instructions 410 to prevent excess polymer from being deposited in subsequent layers. In this instance, the slicing instructions may involve increasing the layer height, decreasing the material feed rate, and/or decreasing the extrudate width. In this way, a number of defects may be detected during the printing process by a variety of quality detecting techniques and hence, a variety of correcting instructions 404 and slicing instructions 410 may be determined by the feedback controllers 402 and 408.

Figure 6:
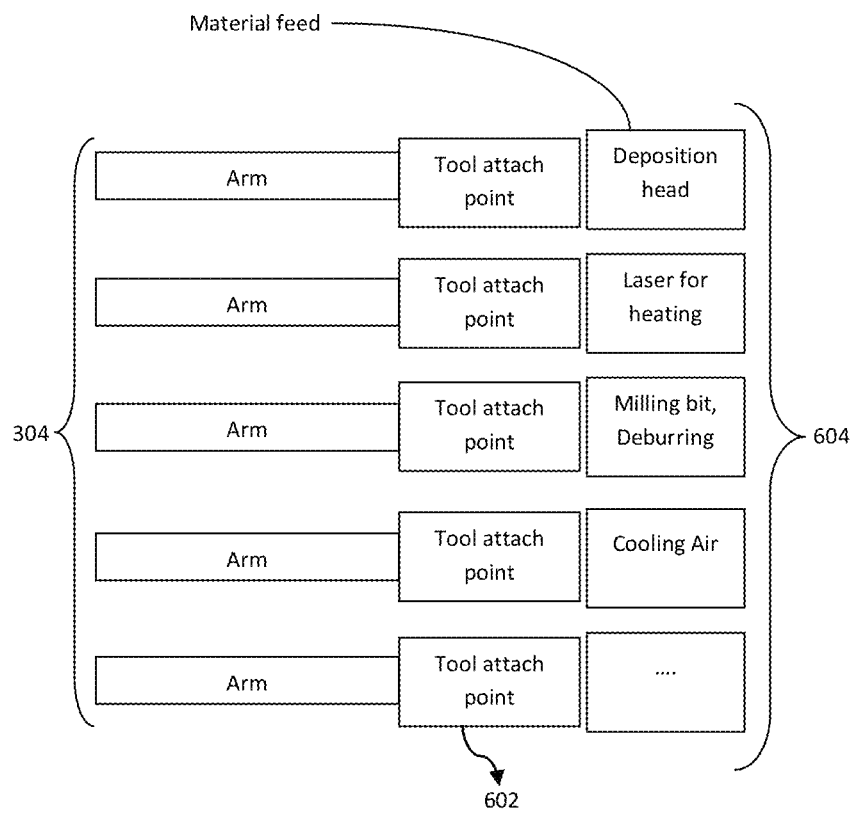
FIG. 6 illustrates an exemplary illustration wherein functional tool heads are attached to a plurality of robotic manipulators used in additive manufacturing method, in accordance with an embodiment of the present invention.

FIG. 6 illustrates an exemplary illustration wherein the functional tool heads 304 are attached to a plurality of tool head attachments 604 used in the additive manufacturing method. As shown in FIG. 6, each functional tool head 304 may have a tool attaching point 602. The tool attaching point 602 may be utilized to fix a tool head attachment 604 to the functional tool head 304 that performs a specific functionality. The functional tool heads 304 are the automatic working devices for the printing process to perform desired functions. Each of the functional tool head 304 may be equipped with a tool head attachment 604 that performs a specific function and is attached to the tool attaching point 602 of the functional tool head 304. It might also be a possible case, where the functional tool head 304 may pick up a variety of fixtures, where the fixtures act as tool head attachments, performing different functionalities, and are attached to the functional tool head 304 via the tool attaching point 602.

Therefore, if a functional tool head 304 is instructed to perform cooling, it may pick up a fixture or tool head attachment 604 that performs the cooling function and attaches the particular tool head attachment 604 via the tool attaching point 602. Thereafter, if the same functional tool head 304 is instructed to capture a thermal image, it may drop the cooling tool head and pick up a new fixture or tool head attachment 604 that works as a thermal imaging device and attaches the particular tool head attachment 604 via the tool attaching point 602. In this way, the functional tool head 304 may interchange the functionality according to the need of the printing process.

In another embodiment, the functional tool heads 304 may perform dedicated functions, such as depositing build material, heating, cooling, blowing air, milling, deburring, laser heating, and the like. Therefore, each functional tool head 304 attaches the corresponding tool head 604 via the tool attaching point 602.

Figure 7:
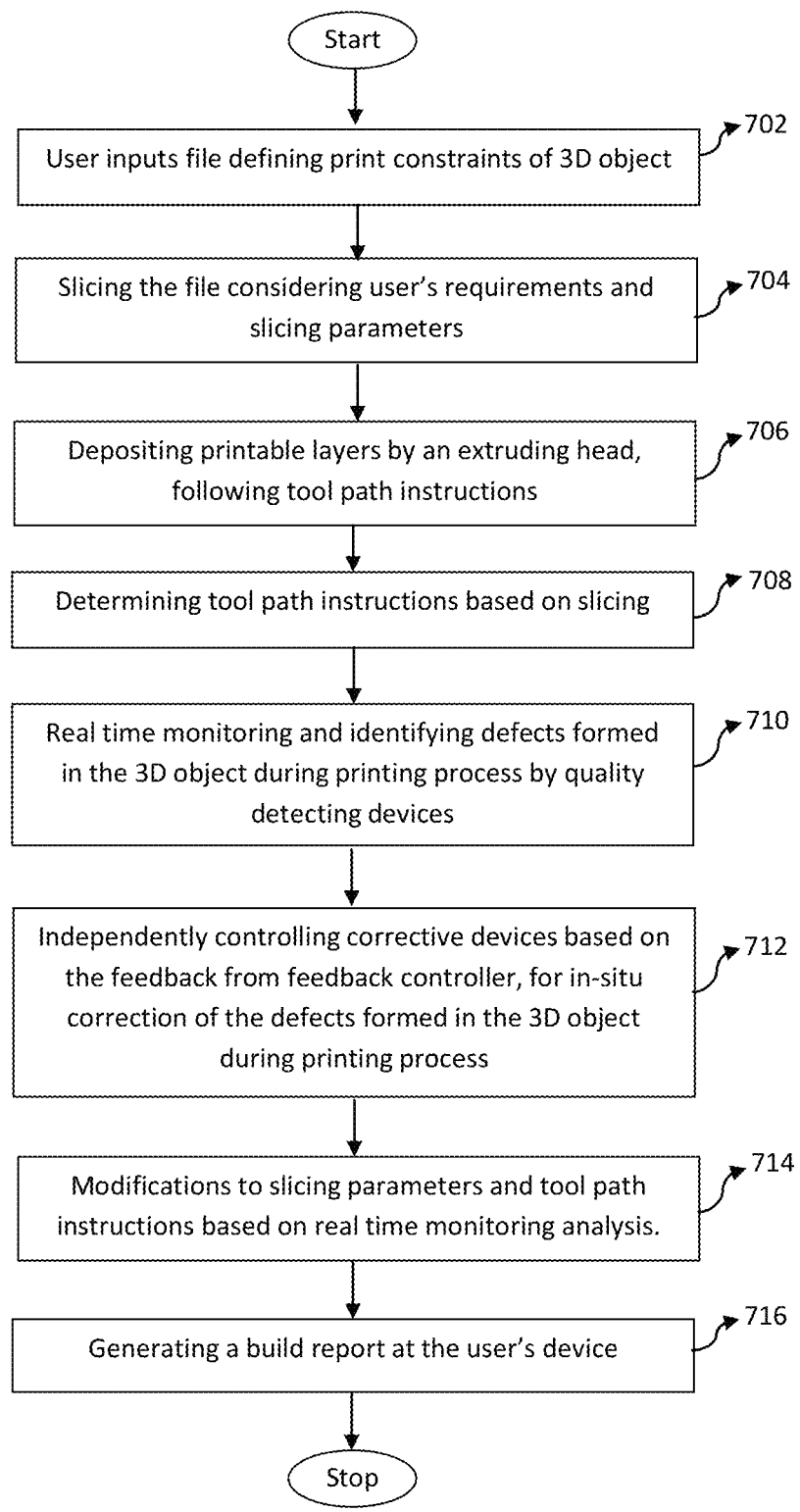
FIG. 7 illustrates a flowchart showing a method of additive manufacturing to print a 3D object with monitoring, identifying and correcting defects in the printed 3D object, in accordance with an embodiment of the present invention.

FIG. 7 illustrates a flowchart showing a method of additive manufacturing to print a 3D object with real time process monitoring, identifying and correcting defects in the printed 3D object, in accordance with an embodiment of the present invention. At step 702, a user may input a 3D data file 202 using a user device, where the 3D data file defines the characteristics of a 3D object. In an embodiment of the present invention, the user device may be a computing device, including and is not limited to a computer, that may further include 3-D modeling software, such as AutoCad and the like. In a further embodiment, the 3D data file may include and is not limited to a CAD file, or an STL file, or a COD file, and the like. In another embodiment, characteristics of the object may include and is not limited to structural geometry of the object, inherent material properties, such as mechanical, electrical, chemical, and thermal properties, and the like. In a further embodiment, the additive manufacturing method is an extrusion based printing method or continuous fiber based deposition processes, including and not limited to fused deposition modeling, fused filament fabrication and the like; and other methods, such as droplet based, jetting methods and the like.

After receiving the 3D data file 202, a first engine, such as a slicing engine 300 discretizes the 3D file 202 into a plurality of segments along arbitrary planes, at step 704. Additionally, the slicing engine 300 is also capable of discretizing the 3D data file 202 into a number of slices along two dimensional planes. Following slicing of the file 202, at step 706, a set of tool path instructions 206, therefore, are then formulated using the slicing engine 300 depending on a set of slicing and material parameters 204a and object property requirements 204b. The tool path instructions 206 are also adjusted in-situ by the slicing feedback controller to reduce the future occurrence of defects and ensure that the object requirements are met.

The build apparatus may comprise a plurality of functional tool heads 304 with a plurality of tool head attachments possessing multiple degrees of freedom of motion for printing a 3D object and also assist in the printing process. In an embodiment, the functional tool heads 304 with attachments may possess more than one, such as 5 or 6, degrees of freedom of motion. The functional tool heads 304 are the working devices of the printing process described in the present invention that work independently and automatically of each other, based on a feedback analysis generated from the system. Further, one or more of the tool head attachments may act as print head, or extruder, or deposition head for depositing layers of build material to print a 3D object on the printing platform in the build apparatus. The tool head attachments working as deposition head may be hereinafter referred to as extruding head 306 that may be controlled by a controller 302. The controller 302 remains in communication with the user device for receiving tool path instructions 206. Therefore, at step 508, the controller may instruct the extruding head 306 to follow the tool path instructions 206 and deposit the printable layers of a building material to build the 3D object.

In an embodiment, the movement of the functional tool head 304 is controlled by the controller 302. The controller 302, on receiving the tool path instruction 206 required for printing the 3D objects, controls the movement of the functional heads. The movement of the functional heads 304 can be done either through Cartesian mechanism or through non-Cartesian mechanism. In case of Cartesian movement, the functional heads 304 are moved in X, Y and Z-axis and the movement is restricted to axial movement. In case of Non-Cartesian movement, the functional heads 304 are free to move in any axis.

While the extruding head 306 is working continuously to deposit layers of build material on the printing platform to print the object, there may occur an instance when the printing may possess one or more defects in the object that may further lead to faults in geometry or inherent properties of the object, such as low mechanical strength. In an embodiment, the type of defects may include and are not limited to drooping/sagging, insufficient crystallinity, slow solidification, out of tolerance feature, air bubbles, excess polymer, delamination, overhangs, warping, adhesion between printed layers of the object and the like that can result in insufficient mechanical, chemical, or thermal, or electrical properties of the object.

In order to detect such defects, in real time, while the printing process is happening, the system comprises one or more monitoring devices, such as quality detecting devices 400, to continuously monitor the printing process. The quality detecting devices 400 may employ detecting techniques to perform the detection of defects in 3D object being printed. The detecting techniques include and are not limited to visual imaging, IR/thermal imaging, laser techniques, audio microphones, and the like to identify the features of the defects such as location, type, correction action, temperature and the like. Therefore, at step 710, the quality detecting devices 400 may continuously monitor the printing process and identify the defects forming in the object, by implementing the detecting techniques. The quality detecting devices 400 may include and are not limited to thermal sensors, cameras, lasers, or any other available image detection devices, infrared devices to check the geometry of the object, audio microphones to capture abnormal extrusion sounds, which indicates if the filament is properly dried, and the like devices.

Further, the method of the present invention also provides a mechanism for real time correction of the defects that are occurring while the object is being printed. To accomplish this, one or more of the functional tool heads 304 may act as corrective devices 406 fixing the defects identified by the quality detecting devices 400. Therefore, one or more corrective devices 406 are the tool heads to perform one or more functions for correcting one or more defects, where the type of functions may include cooling, heating, milling, deburring, air blower, and the like that are needed to assist the printing of the object in order to get final printed object with minimal defects.

As soon as the quality detecting devices 400 identify the defects, and their features, such as location and type of defects location, they may store the defects data in a data storage module, where the data defines the features of the defect, such as location, type etc., critical feature measurements, dimensionality, and contour of the build object. Thus, the present invention provides recording and logging of real time events, such as defects, corrections, location of each event in 3D space.

Thereafter, the detected data from the quality detecting devices 400 may be fed to a controller, such as a defect feedback controller 402. At the feedback controller 402, the defected data is analyzed to further generate a set of correcting instructions 404 that should be taken to fix the defects. In an embodiment, analyzing software, such as finite element analysis, may predict the properties of the object considering the types of defect identified by the quality detecting devices 400. Therefore, the defect feedback controller 400 may act as a correction module that generates feedback (correcting instructions 404) depending on the features of the defects.

Thereafter, generating the correcting instructions 404, the defect feedback controller 400 may control the corrective devices 406 and instruct them to perform corresponding functions based on the feedback, generated including the correcting instructions 404. Therefore, at step 712, the correction devices 406 function automatically and independently of each other in-situ correcting the defects formed in the 3D object during printing process, following the correcting instructions 212.

At step 714, considering the defected data from the quality detecting devices 400, a controller, such as a slicing feedback controller 408, may modify the implemented slicing instructions 410 for the slicing engine 300 to further discretize the 3D data file 202. The modified slicing instructions 410 in turn modify the tool path instructions 206 to reduce the future occurrence of defects and ensure that the object requirements are met.

After the completion of the printing and correcting process, a build report may be generated at the user device (step 716), based on the printing and the correction of defects. Based on the feedback from the build volume, where printing and defects correction are simultaneously occurring, the user device may generate a build report visually displaying in 3D space the features of the final printed object and also each corrected and uncorrected defect detailing its type and location within the object. The defect information in the build report may be utilized by an analyzing module of the user device to predict the material properties of the final object based on the type, number, and location of corrected and uncorrected defects. This report also compares the actual material properties of the final object with the user's inputted specifications and identifies any properties that fall outside the specifications.

Furthermore, the information in the build report may help a user to decide whether to keep the final object or scrap the object based on the predicted inherent properties and the features of the corrected and uncorrected defects. This step is a critical step in identifying the worth of the final object. Further, the build report may also help in resolving the mechanical or thermal behavior and uncorrected defects of the built object when it may be re-printed using the similar building constraints and parameters. Thus, the generation of the build report may aid in the optimization of the tool path instructions 206 when printing the same or similar objects with desired properties and further helps a user in knowing the worth of the final printed object.

Therefore, the present invention provides a system and a method of three dimensional printing, where the printing process is monitored in real time for identifying any defects forming in the 3D object. Further, the present invention provides in-situ correction of identified defects, during printing, by independent and automated control of functional tool heads based on a feedback analysis from the printing process.

Following example may be helpful in order to understand the present invention clearly.

In one manifestation of this present invention, a 3D printing machine involves two independently controlled multi-axis functional tool heads. Say those functional tool heads may be robotic arms, where robotic arm X consists of an extruder and robotic arm Y functions as a real-time correction device.

Robotic arm X is controlled by the tool path instructions 206 generated from the CAD file.

Robotic arm Y can employ a number of interchangeable fixtures to correct defects during part manufacturing. Considering, 'B' and 'C' defects are detected real-time using a multi-axis system consisting of D devices during build production, where D devices are quality detecting devices. Image processing software identifies the type, location, and number of defects present. This information is fed into the controlling software (feedback controller) for robotic arm Y, which identifies the appropriate course of action to correct the defect; some defects are not correctable by robotic arm Y but are still logged in the data storage module. This information is fed into a final build report.

Further, Robotic arm Y picks up the appropriate fixture with 'A' functionality to correct the defect. At this time, robotic arm X can continue to extrude material if the deposition site is not affected; otherwise, robotic arm X waits until robotic arm Y has finished correcting the defect. The defect information is used to update the printed object model and slicing parameters. As a result, the subsequent tool path instructions are modified for robotic arm X. Robotic arm Y repeats the above operation to correct every possible defect during the entire build process.

When the build process is complete, the build report is generated, which visually displays each defect detailing its type and location within the part. This information is used to predict the material properties of the final part based on the type, number, and location of corrected and uncorrected defects.

In an embodiment, the functionality 'A' can be cooling, heating, milling/deburring, and the like. In an embodiment, the defect 'B' can be drooping/sagging, insufficient crystallinity, slow solidification, out of tolerance feature, and the like. The defect 'C' air bubbles, excess polymer, delamination, overhangs, warping, adhesion between printed layers of the object and the like.

In an embodiment, the quality detecting device 'D' can be visual imaging, IR/thermal, laser techniques, audio microphones, and the like.

We claim:

1. A method for printing a three-dimensional (3D) object, comprising:
    providing a printing instruction generated based at least in part on (i) a model of the 3D object and (ii) one or more printing parameters;
    initiating printing of a part corresponding to the 3D object using the printing instruction;
    using one or more monitoring devices to detect one or more defects in a previously printed portion of the part while printing the part corresponding to the 3D object; and
    generating a correcting instruction to correct for the one or more defects in the previously printed portion of the part while printing the part, wherein the correcting instruction is configured to direct the one or more print heads to modify a structure of the previously printed portion of the part.

2. The method of claim 1, further comprising, prior to the providing of the printing instruction, providing a data object comprising the one or more printing parameters.

3. The method of claim 2, wherein the providing of the printing instruction comprises discretizing the data object into a plurality of segments to generate the printing instruction.

4. The method of claim 1, further comprising using the correcting instruction to modify the printing instruction, thereby generating a modified printing instruction.

5. The method of claim 4, further comprising using the modified printing instruction to modify the part.

6. The method of claim 1, further comprising sending the correcting instruction to at least one corrective device for correcting the one or more defects while the part is being printed.

7. The method of claim 6, wherein the at least one corrective device performs one or more functions selected from the group consisting of cooling, heating, milling, deburring, and extruding.

8. The method of claim 1, further comprising generating a build report comprising at least one feature of the one or more defects.

9. The method of claim 8, further comprising analyzing the build report to determine one or more final properties of the part.

10. The method of claim 1, further comprising logging real time monitoring data of the one or more defects in a data storage module.

11. The method of claim 1, wherein the one or more defects comprise a void, and wherein the correcting instruction comprises an instruction for correcting the void.

12. A system for printing a three-dimensional (3D) object, comprising:
    an instruction engine configured to generate a printing instruction for printing the 3D object;
    one or more print heads configured to print a part corresponding to the 3D object using the printing instruction;
    one or more monitoring devices for detecting one or more defects in a previously printed portion of the part during printing; and
    a controller operatively coupled to the one or more print heads and the one or more monitoring devices, wherein the controller is configured to:
    (i) use the one or more monitoring devices to detect the one or more defects in the previously printed portion of the part while printing the part; and
    (ii) generate a correcting instruction to correct for the one or more defects in the previously printed portion of the part while printing the part, wherein the correcting instruction is configured to direct the one or more print heads to modify a structure of the previously printed portion of the part.

13. The system of claim 12, wherein the controller is further configured to communicate with the instruction engine and instruct the instruction engine to use the correcting instruction to modify the printing instruction.

14. The system of claim 12, further comprising a module configured to (i) generate a build report comprising at least one feature of the one or more defects; and (ii) analyze the build report to determine one or more final properties of the part.

15. The system of claim 14, wherein the module is configured to analyze the build report using finite element analysis.

16. The system of claim 14, wherein the build report comprises an identification of one or more properties of the part that fall outside of one or more specifications of the 3D object.

17. The system of claim 12, further comprising a data storage module configured to record data indicative of the one or more defects of the part.

18. The system of claim 12, wherein the correcting instruction comprises an instruction for cooling, heating, milling, deburring, or extruding.

19. The system of claim 12, wherein the one or defects comprise a void, and wherein the correcting instruction comprises an instruction for correcting the void.

20. The system of claim 12, wherein the one or more monitoring devices employ visual imaging, thermal imaging, or laser-based detection.

* * * * *